US010963309B2

(12) United States Patent
LeBeane et al.

(10) Patent No.: US 10,963,309 B2
(45) Date of Patent: Mar. 30, 2021

(54) NETWORK INTERFACE CONTROLLER-BASED SCHEDULING OF PROCESSING TASKS IN A DISTRIBUTED COMPUTING SYSTEM

(71) Applicant: Advanced Micro Devices, Inc., Sunnyvale, CA (US)

(72) Inventors: Michael W. LeBeane, Austin, TX (US); Abhisek Pan, Austin, TX (US); Steven K. Reinhardt, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 209 days.

(21) Appl. No.: 15/267,936

(22) Filed: Sep. 16, 2016

(65) Prior Publication Data

US 2018/0081715 A1 Mar. 22, 2018

(51) Int. Cl.
*G06F 9/48* (2006.01)
*G06F 9/50* (2006.01)

(52) U.S. Cl.
CPC .................................. *G06F 9/505* (2013.01)

(58) Field of Classification Search
None
See application file for complete search history.

(56) References Cited

U.S. PATENT DOCUMENTS

| 6,076,114 A | 6/2000 | Freund | |
| 7,559,062 B2* | 7/2009 | Code | G06F 9/4881 718/102 |
| 8,009,563 B2* | 8/2011 | McDaniel | H04L 29/06 370/230.1 |
| 8,015,541 B1 | 9/2011 | Srinivasan et al. | |
| 9,571,426 B2* | 2/2017 | Agarwal | H04L 49/9047 |
| 9,916,178 B2* | 3/2018 | Dinan | G06F 9/4881 |
| 9,959,142 B2* | 5/2018 | Hsu | G06F 9/5033 |
| 2003/0225739 A1* | 12/2003 | Chesson | H04L 47/10 |

(Continued)

OTHER PUBLICATIONS

Majeti, D., "COHX: CHAPEL ON HSA+XTQ Adventures of PGAS Language in a Heterogenous World", The International Conference for High Performance Computing, Networking, Storage, and Analysis, Nov. 18, 2014, 11 pgs., IEEE Computer Society, New Orleans, LA, USA.

(Continued)

*Primary Examiner* — Van H Nguyen
(74) *Attorney, Agent, or Firm* — Volpe Koenig (57) ABSTRACT

Techniques for scheduling processing tasks in a device having multiple computing elements are disclosed. A network interface controller of the device receives processing tasks, for execution on the computing elements, from a network that is external to the device. The network interface controller schedules the tasks for execution on the computing devices based on policy data available to the network interface controller. A scheduler within the network interface controller, which can be implemented as a standalone processing unit (such as a microcontroller, a programmable processing core, or an application specific integrated circuit), performs such scheduling, thereby freeing the central processing unit of the device from the burden of performing scheduling operations. The scheduler schedules the tasks according to any technically feasible scheduling technique.

20 Claims, 4 Drawing Sheets

(56) References Cited

U.S. PATENT DOCUMENTS

2008/0126751 A1* 5/2008 Mizrachi ................ G06F 9/485
                                                                    712/30
2014/0331230 A1 11/2014 Reinhardt et al.
2016/0342547 A1* 11/2016 Liss ...................... G06F 13/385

OTHER PUBLICATIONS

Balaji, P. et al., "MPICH BoF", The International Conference for High Performance Computing, Networking, Storage, and Analysis, Nov. 18, 2014, 86 pgs., IEEE Computer Society, New Orleans, LA, USA.

Weinsburg, Y. et al., "On a NIC's Operating System, Schedulers and High-Performance Networking Applications", Proceedings of the 2nd International Conference on High Performance Computing and Communications, Sep. 13-15, 2006, pp. 380-389, Munich, Germany.

Wagner, A. et al., "NIC-Based Offload of Dynamic User-Defined Modules for Myrinet Clusters", 6th IEEE International Conference on Cluster Computing, Sep. 20-23, 2004, p. 204-214, San Diego, CA, USA.

Kyriazis, George, "Heterogenous System Architecture: A Technical Review", Aug. 30, 2012, 18 pgs., Rev. 1.0, Advanced Micro Devices, Inc., USA.

* cited by examiner

NETWORK INTERFACE CONTROLLER-BASED SCHEDULING OF PROCESSING TASKS IN A DISTRIBUTED COMPUTING SYSTEM

BACKGROUND

A distributed computing system is a system in which multiple computing devices cooperate to perform computational work. Computing devices in such a system transmit requests to perform specific items of computational work to other computing devices in the system. Upon receiving an item of computational work, a computing device executes the work and may return result data to the computing device that sent the request to perform the unit of computational work. Efficient operation of the various computing devices in a distributed computing system is desirable.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for scheduling processing tasks in a device having multiple computing elements. A network interface controller of the device receives processing tasks, for execution on the computing elements, from a network that is external to the device. The network interface controller schedules the tasks for execution on the computing devices based on policy data available to the network interface controller. A scheduler within the network interface controller, which can be implemented as a standalone processing unit (such as a microcontroller, a programmable processing core, or an application specific integrated circuit), performs such scheduling, thereby freeing the central processing unit of the device from the burden of performing scheduling operations. The scheduler schedules the tasks according to any technically feasible scheduling technique.

Figure 1A:
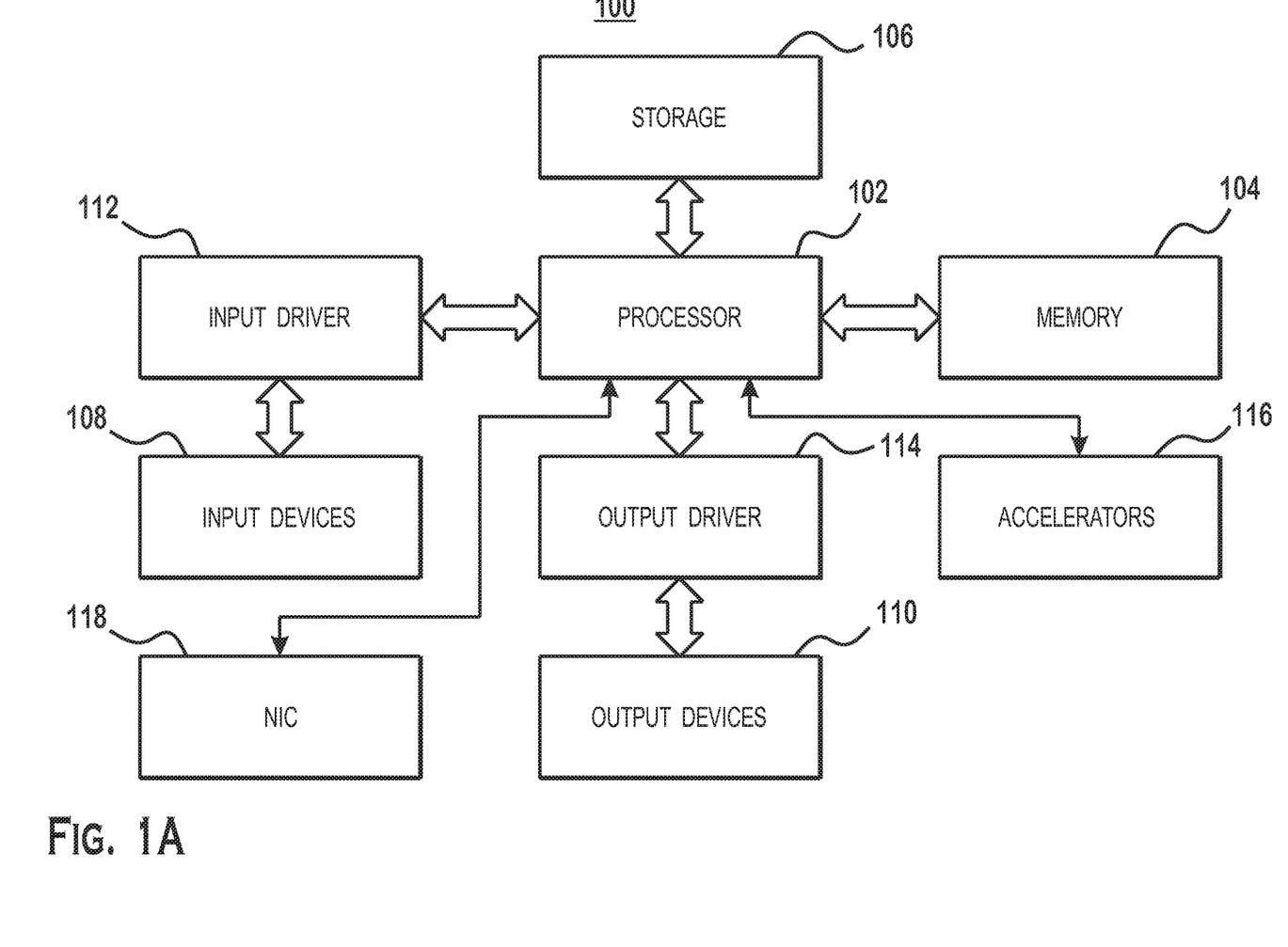
FIG. 1A is a block diagram of an example device in which one or more disclosed embodiments is implemented.

FIG. 1A is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes one or more of: a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110.

The network interface card ("NIC") 118 provides an interface to other devices via a computer network. The NIC 118 is configured to communicate with an external device via a networking protocol such as ethernet, wi-fi, InfiniBand, or other protocols. The accelerators 116 include one or more devices that are configured to accept and execute processing tasks. These devices include one or more of a graphics processing unit ("GPU"), field programmable gate array ("FPGA"), processing-in-memory chip ("PIM"), application-specific integrated circuit ("ASIC"), or other device.

Figure 1B:
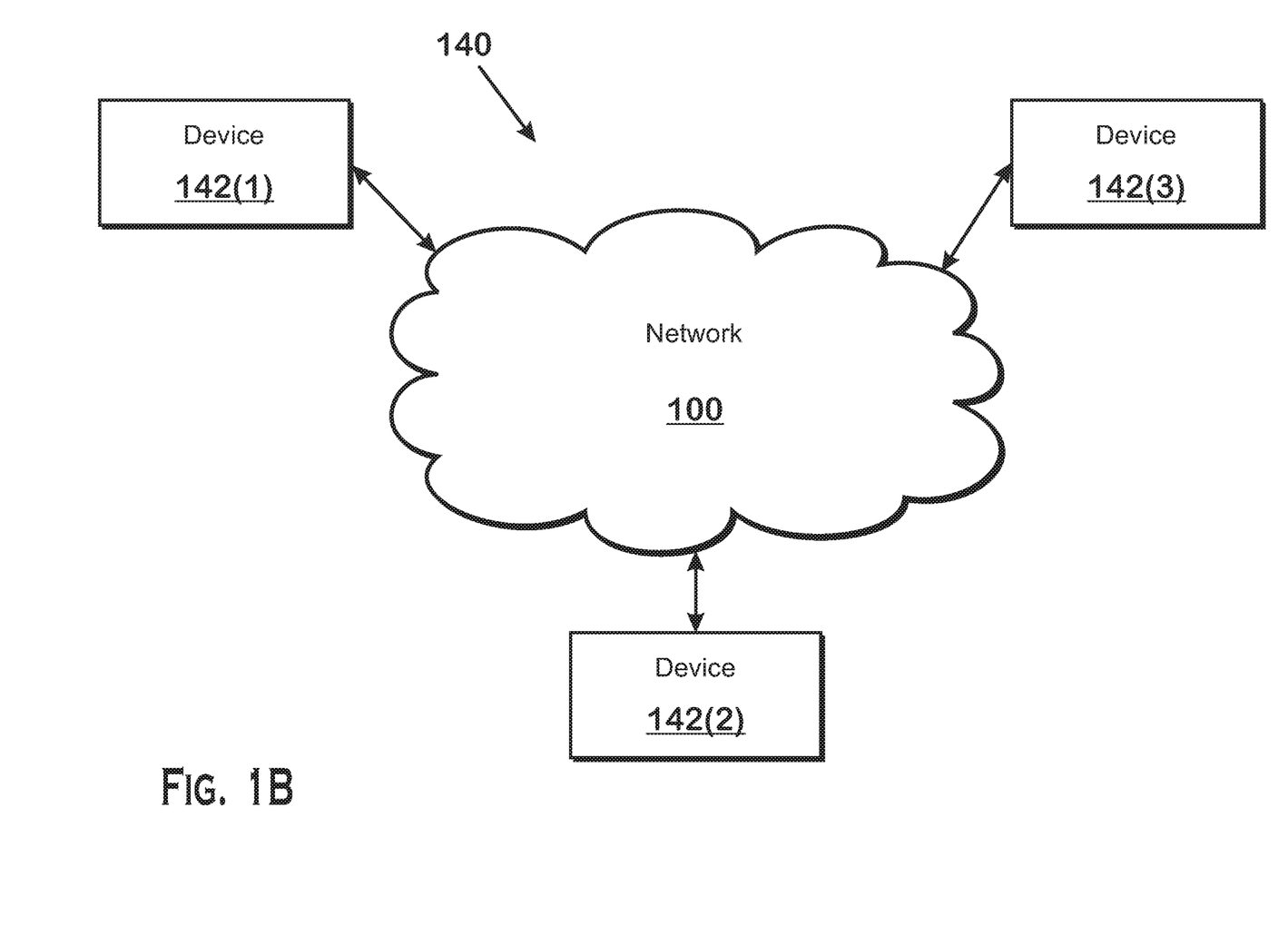
FIG. 1B is a block diagram of a networked computer system, according to an example.

FIG. 1B is a block diagram of a distributed computer system 140, according to an example. As shown, the distributed computer system 140 includes a network 150 and devices 142. Each device may be similar to or different from the device 100 illustrated in FIG. 1A.

At least one of the devices 142 is configured to transmit one or more tasks for execution to at least one of the other devices 142. Tasks include sequences of operations to be performed by the device 142 that receives the task. The sequences of operations may be embodied, for example, as CPU programs or GPU shader programs (also referred to as "kernels") for execution at the destination device 142. In various examples, a device 142 transmits such tasks for execution in accordance with task distribution policies such as load balancing or the like, or in accordance with specific programmatic instructions embedded into software executing on the transmitting device. In one example of load balancing, a device 142 is performing a set of work and is aware that another device 142 is less busy. In response, the busy device 142 transmits one or more tasks to the less busy device 142.

In one example, tasks for execution are transmitted in the form of task descriptors. Task descriptors include an indication of one or more operations to be performed as well as task metadata. The metadata includes an identifier that allows the devices 142 to uniquely identify each task, as well as other metadata. In various examples, the other metadata includes pointers to data used by the task, validity information, and other information for executing the task.

In one example, devices 142 transmit tasks to other devices 142 via a remote dynamic memory access ("RDMA") technique. With such a technique, upon receipt of a task, the NIC 118 of a receiving device 142 directly stores the task in memory (e.g., system memory 104) and no CPU intervention is required. In some examples, a NIC 118 determines whether an available location for task storage exists (e.g., in a queue 204, as discussed with respect to FIG. 2). If an available location exists, the NIC 118 writes the task to a location in memory and if no location exists, the NIC 118 informs the transmitting device that the receiving device 142 is unable to process the task.

Figure 2:
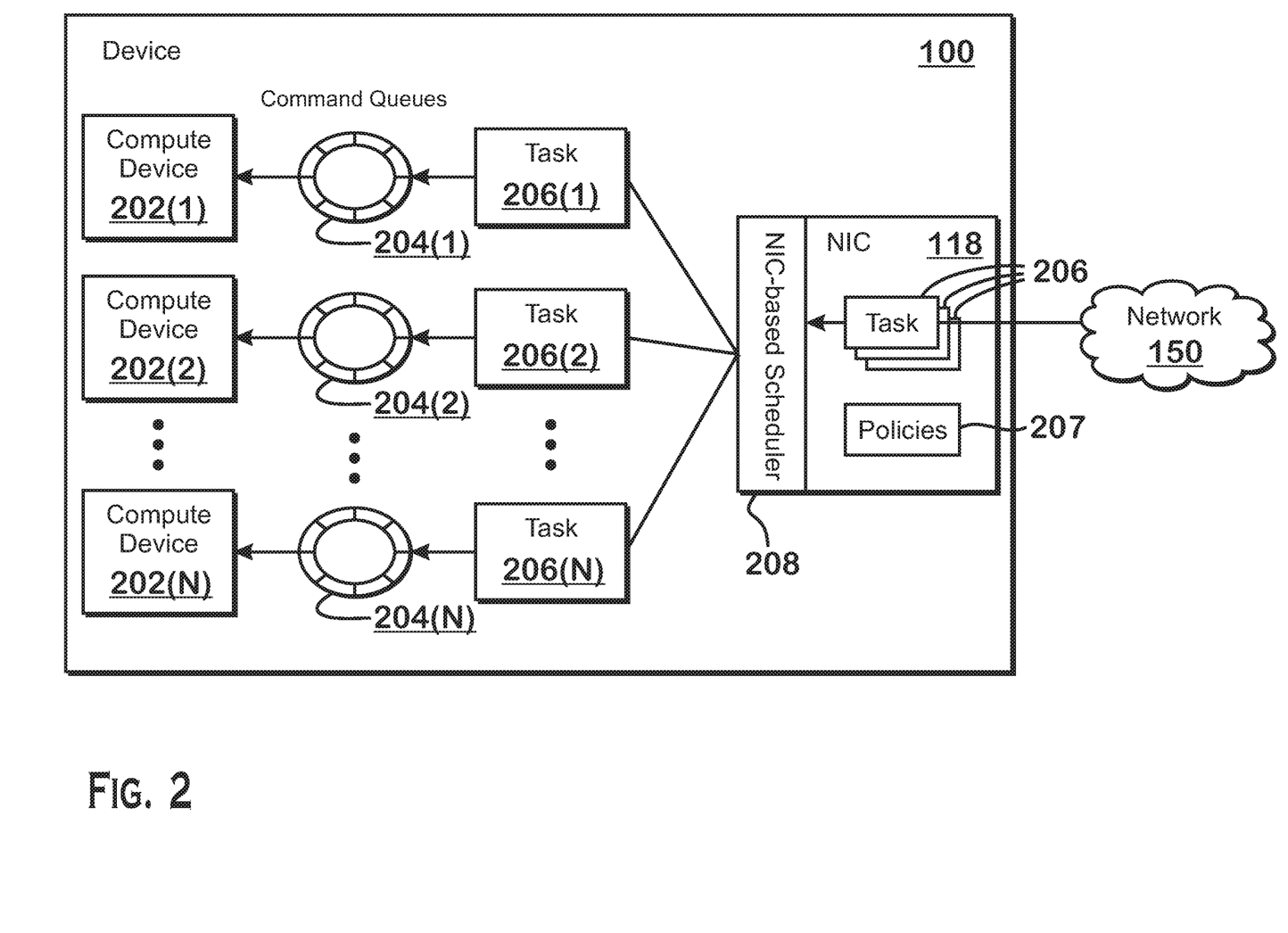
FIG. 2 is a diagram illustrating execution of tasks received over a network, according to an example.

FIG. 2 is a diagram illustrating execution of tasks 206 received via a network 150, according to an example. As shown, a NIC 118 receives tasks 206 from a device 142 via network 150. A scheduler 208 in the NIC 118 examines scheduling policies 207 to determine which compute device 202 each task 206 should be transmitted to. Scheduling policies 207 include data available to the NIC 118 that may be specified by a user or that may be programmatically determined by software executing on a CPU or another processor. The scheduling policies 207 may be stored in a memory accessible to the NIC 118 or may be hard coded in circuitry, for example, in circuitry of an ASIC.

The compute devices 202 represent one or more of a central processing unit ("CPU") (e.g., included within processor 102), a graphics processing unit ("GPU") (e.g., included within an output driver 114 or accelerator 116), an application-specific integrated circuit ("ASIC") or other types of processing units. In some examples, any of the compute devices 202 are able to execute any of the tasks received by the device 100. In some examples, the compute devices together implement a distributed computing architecture having a unified memory address space. One example of such a computing architecture is the heterogeneous system architecture ("HSA") developed by the HSA Foundation of Beaverton, Oreg., United States. One feature of HSA is that the compute devices included in a single heterogeneous system may communicate with each other through architected shared-memory command queues, regardless of the type of the device (e.g., whether the devices are CPUs, GPUs, ASICs, or the like). Another feature of HSA is that the compute devices share a unified address space (meaning that each compute device 202 is capable of accessing data via the same address values, regardless of where the data in that unified memory space is actually physically stored, such as in system memory 104, memory on a graphics card, or other locations). Some or all of the above features may be implemented in a distributed computing architecture.

The policies 207 that are used to determine a destination compute device 202 for the tasks 206 include one or more of a queue occupancy-based policy, a priority-based policy, a preferred compute device-based policy, an execution time prediction-based policy, a data locality-based policy, and a manual override policy. These policies are provided as examples and other scheduling policies may alternatively or additionally be used. After consulting the policies 207 and analyzing tasks to be scheduled, the scheduler 208 identifies a compute device 202 to execute a particular task based on the policies 207 and on the character of the tasks. The scheduler 208 then transmits the task to a command queue 204 (also referred to herein simply as a "queue" 204) associated with the identified compute device 202. A compute device 202 associated with that queue 204 retrieves the task 206 from that queue 204 and processes the task.

FIG. 2 is shown as including command queues 204 that are uniquely assigned to single compute devices 202. However, in alternatives, a compute device 202 is be assigned to more than one queue 204 such that the compute device 202 processes tasks stored in any of the queues assigned to that compute device 202. In other alternatives, more than one compute device 202 is be assigned to a single queue 204 such that each such compute device 202 processes tasks from the single queue 204 (i.e., the queue 204 is shared between compute devices).

The scheduler 208 is integrated into the NIC 118 so that the scheduler 208 has direct access to tasks 206 received by the NIC 118 over the network 150. If the scheduler were instead implemented outside of the NIC 118, such as within a CPU within the processor 102, then such scheduling operations would lead to certain inefficiencies. For example, because the CPU would be performing the scheduling operations, the CPU would experience processing slowdowns resulting from the workload associated with the processing necessary for making scheduling decisions. In addition, performing scheduling operations on a CPU would require certain operations not required for NIC-based scheduling, such as transmitting the tasks 206 to system memory 104 by the NIC 118, reading the tasks from system memory 104 by the CPU, processing the tasks by the CPU, and scheduling the tasks for execution by one of the compute devices 202. Integrating the scheduler 208 into the NIC 118 thus reduces the processing load on the CPU (or whatever processing device would otherwise perform scheduling operations) and decreases the task launch latency on the target compute devices 202.

The scheduler 208 is implemented in any technically feasible manner. In various examples, the scheduler 208 is implemented as a programmable microcontroller that executes computer instructions (e.g., firmware) to implement the policies 207 or an application-specific integrated circuit (ASIC) that is configured to implement the policies 207. As described above, the scheduler 208 considers one or more of the policies listed above (queue occupancy, preferred compute device, execution time prediction, data-locality, priority policy, override policy) in order to determine which compute device 202 a particular task 206 should be sent to. In various examples, for any particular task, the scheduler 208 calculates a score for one or more compute devices 202 based on one or more of the above policies and identifies the compute device 202 with the highest (or lowest) score to receive the analyzed task. In various examples, the scheduler 208 combines multiple scores for multiple policies to output a final score for a particular task and bases scheduling decisions, such as which compute device 202 to send a particular task 206 to, on this final score. In such examples, the scheduler 208 calculates weighted versions of the scores for one or more policies and combines the weighted version of the scores (e.g., through addition) to arrive at the final score. In some examples, individual policies override other policies. In one example, if the manual override policy is specified for a particular task or task type, then that policy overrides all other policies and is deterministic as to which compute device 202 receives a particular task 206 for processing. In other examples, the manual override policy is a suggestion and is provided with a high weight. In general, results from application of any particular policy may be obtained and combined or applied individually to make scheduling decisions in any technically feasible manner. Some example techniques for using policies 207 to schedule tasks 206 are now described.

The queue occupancy policy considers the "occupancy" of one or more queues 204 in determining which queue 204 to place a task in. In various examples, in evaluating the queue occupancy policy, the scheduler determines the fullness of one or more of the queues 204 (i.e., determines a "queue occupancy metric"). In one example, a queue 204 includes a read pointer and a write pointer. The read pointer indicates the next task 206 to be read by a compute device 202 and the write pointer indicates the queue entry into which the scheduler should place the next task 206. The difference between the value (i.e., address) of the write pointer and the value of the read pointer indicates the number of items in the queue 204 (one example of the queue occupancy metric). Regarding the "scoring" technique described above, in various examples, a score for a particular compute device 202 is assigned for a task 206 based on the queue occupancy metric (or some modified version, e.g., through normalization). For example, a score for a particular compute device 202 can be assigned as the queue occupancy metric, multiplied by a normalization value.

In some examples, a slightly modified version of queue occupancy, a device business policy, considers device business as reported directly by a compute device 202. Any particular compute device 202 may report device business in any technically feasible manner. The device business policy is different than the queue occupancy policy in that the queue occupancy policy infers device business based on queue occupancy.

The preferred compute device policy assigns tasks 206 to queues 204 based on preferred compute device data. The preferred compute device data, stored in policy data 207, indicates a specific compute device 202 or a compute device type (e.g., CPU, GPU, or other type of compute device 202) on a per-task basis (identified, e.g., based on a task identifier) or on a per task type basis (where task type is simply a logical grouping of "similar" tasks). For example, tasks of one particular type may include sequences of large amounts of processing items with little or no co-dependencies that are suitable for execution on a graphics processing unit (which often includes multiple single-instruction-multiple-thread ("SIMT") units capable of efficiently performing such processing tasks). In such an example, the policy data 207 may specify that tasks of such a type should be scheduled on GPU type compute devices 202 instead of on other types of compute devices 202. In some examples, this specification of compute device 202 may be a "suggestion," meaning that the scheduler 208 gives the specification some weight in identifying a compute device 202 to receive a task but that the specification is not strictly deterministic. Regarding the "scoring" technique described above, in various examples, a score for a particular compute device 202 is assigned for a task 206 based on whether or not that compute device 202 is considered "preferred" for that task. A different, lower score (such as 0) is assigned for a compute device 202 if that compute device 202 is not indicated as being preferred.

The execution time prediction policy is a policy that bases the decision of which compute device 202 to assign a particular task 206 to using a predicted execution time of a task 206 on a particular compute device 202. The scheduler 208 determines predicted execution time via any known technique. In one example, the scheduler 208 determines predicted execution time based on analytical models of the potential target compute devices 202 and high-level execution characteristics of task 206. In another example, the scheduler 208 determines predicted execution time based on historical execution time for the same or a similar task 206. Regarding the "scoring" technique described above, in various examples, a score for a particular compute device 202 is assigned for a task 206 based on the predicted execution time. A compute device 202 predicted to have a lower execution time for a particular task 206 is assigned a higher score and a compute device 202 predicted to have a higher execution time for a particular task 206 is assigned a lower score.

In the data-locality policy, the scheduler 208 assigns tasks to compute devices 202 based on data-locality. Data-locality refers to the locality of data used by the task with respect to the compute device 202 to which the task 206 is assigned. More specifically, this policy determines whether data needed for a particular task is stored locally to one or more of the compute devices 202 and favors compute devices 202 for which such local data exists. In one example, the scheduler 208 determines whether data is local to a particular compute device 202 based on ongoing data locality reporting performed by one or more of the compute devices 202. For example, when a compute device 202 creates a data item, the compute device 202 may indicate to the scheduler 208 the location of that particular data item. When a compute device 202 migrates a particular data item to another location, the compute device 202 also reports that migration to the scheduler 208. Regarding the "scoring" technique described above, in various examples, a score for a particular compute device 202 is assigned for a task 206 based on whether or not data is local to the compute device 202 at issue. Data that is local is assigned a particular score and data that is not local is assigned a different, lower score (such as 0).

At least one type of policy, the "priority" policy, is for determining the priority of tasks 206, which may also involve identifying a particular compute device 202 to receive a task 206. The policies 207 may specify a numerical priority for one or more tasks and/or for one or more task types. The scheduler 208 issues tasks 206 to command queues 204 in an order that is based on this numerical priority. In one example, the scheduler 208 issues tasks of a higher priority at a higher rate than tasks of a lower priority. In another example, the scheduler 208 directs tasks 206 to compute devices 202 in different ways in order to create priority-based differentiation between compute devices 202. More specifically, the scheduler 208 directs most tasks 206 away from compute devices 202 designated as being high priority. Then, the scheduler 208 directs high priority tasks 206 to compute devices 202 that are currently processing not many tasks 206. In one example, the term "not many tasks" in this context means that the number of tasks 206 currently being processed by, and that are currently within, an associated command queue 204 for a particular compute device 202 is lower than a particular threshold. In another example, the term "not many tasks" in this context means that a low enough number of number of tasks 206 are currently being processed by the compute device 202 and are currently in a command queue 204 for the compute device 202, such that the latency with which tasks 206 are processed is below a particular threshold. In various examples, tasks or task types for which no priority is specified receive a default priority.

In one policy, an override policy, the policies 207 include information indicating that a specific task or task type is to be assigned to a specific compute device 202. If policies 207 include such information, then all other policy decisions are overridden and scheduler 208 schedules the task at issue for execution on the indicated compute device 202.

Policies are specified on a per-task or per-task-type basis. In some examples, policies are only applied to the tasks for which policies are specified. In other examples, default values are applied for one or more tasks for which policies are not specified. Each policy can be individually applied. In other words, any particular policy can override all other policies or a subgroup of all other policies. Alternatively, one or more of the policies can be applied together. In one example of applying policies together, scheduler 208 identifies all policies that apply for a particular task, calculate a score for each policy, and combines the scores to obtain a final result. The scheduler 208 may weight each score before combining the weighted scores to obtain the final result. The scheduler 208 would calculate such a score for each compute device 202. Whichever compute device 202 has the highest score for a particular task 206 is the compute device 202 to which the scheduler 208 assigns the task 206.

Figure 3:
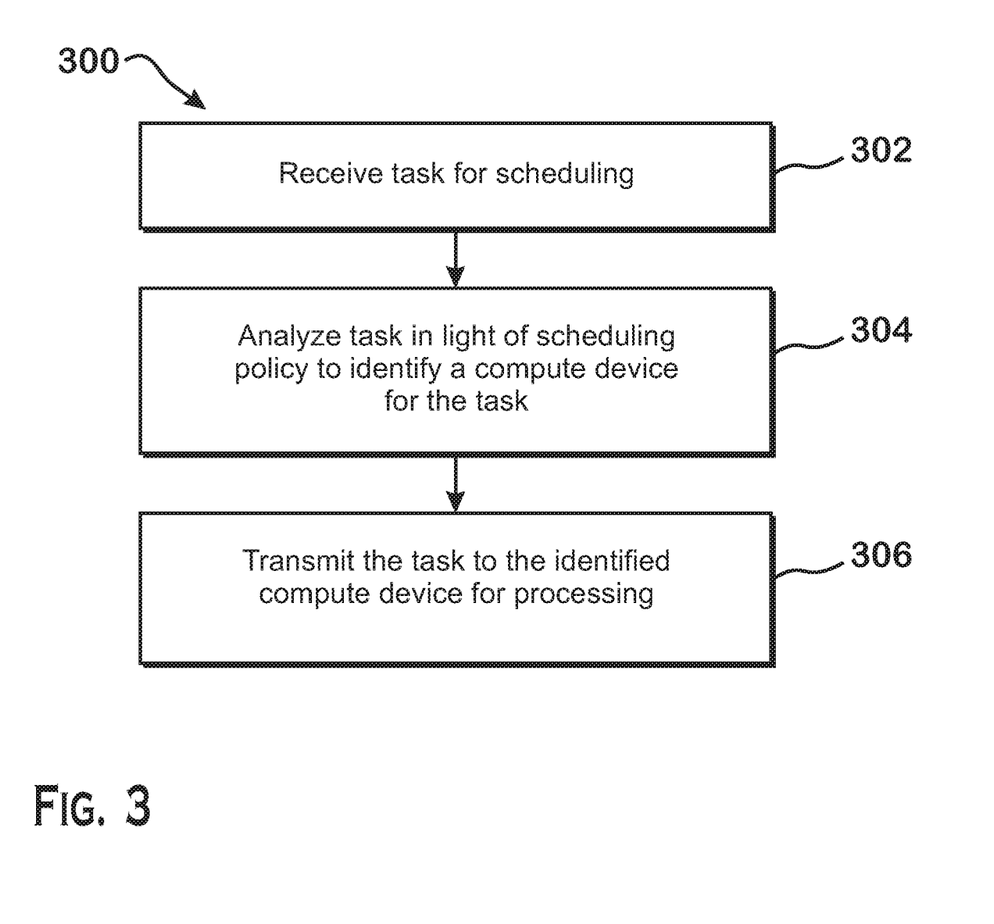
FIG. 3 is a flow diagram of a method for assigning compute tasks to compute devices, via a network-interface controller-based scheduler, according to an example.

FIG. 3 is a flow diagram of a method 300 for assigning compute tasks 206 to compute devices 202, via a network-interface controller-based scheduler 208, according to an example. Although described with respect to the system shown and described with respect to FIGS. 1A, 1B, and 2, it should be understood that any system configured to perform the method, in any technically feasible order, falls within the scope of the present disclosure.

As shown, a method 300 begins at step 302, where a network interface controller 118 of a device 100 receives a task for scheduling from a network external to the device 100. The task specifies one or more units of computational work for execution by a compute device 202 of the device 100.

At step 304, a scheduler 208 of the network interface controller 118 analyzes the received task in light of scheduling policies to identify a compute device for the task. In various examples, the scheduling policies include one or more of a queue occupancy-based policy, a priority-based policy, a preferred compute device-based policy, an execution time prediction-based policy, a data locality-based policy, and a manual override policy. The scheduling policies specify, on a per task basis, or on a per task type basis, which scheduling policies to apply. In various examples, for any particular task, the scheduler 208 applies a single one of the scheduling policies to identify a compute device 202 for execution of a task or combines results from multiple scheduling policies to identify a compute device 202 for execution of a task.

At step 306, the scheduler 208 transmits the task to the compute device 202 identified at step 304 for execution. More specifically, the scheduler 208 stores the task in a queue 204 associated with the compute device. The compute device associated with that queue 204 performs the tasks stored in that queue.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for scheduling processing tasks for execution by two or more compute devices in a distributed computing system, the method comprising:
   receiving, via a network interface controller, a first task for processing by one of the two or more compute devices, wherein the two or more compute devices are external to the network interface controller;
   analyzing, by a scheduler integrated within the network interface controller, the first task, in light of one or more scheduling policies;
   selecting, by the scheduler, a first compute device from among the two or more compute devices to receive the first task, based on the analyzing; and
   transmitting the first task to a first queue associated with the first compute device, the first queue being configured to store tasks for execution by the first compute device, the first queue being included within a plurality of queues,
   wherein:
      the one or more scheduling policies includes a queue occupancy policy;
      analyzing the first task in light of the one or more scheduling policies comprises determining queue occupancy metrics for one or more of the queues in the plurality of queues; and
      selecting the first compute device comprises selecting the first compute device based on the queue occupancy metrics, and
   wherein the analyzing, selecting, and transmitting are performed without intervention from a central processing unit of the first compute device.

2. The method of claim 1, wherein:
   the one or more scheduling policies includes a preferred computing device policy;
   analyzing the first task in light of the one or more scheduling policies comprises identifying a preferred computing device for the first task based on one of a task identifier associated with the first task and a task type associated with the first task; and
   selecting the first compute device comprises selecting the first compute device based on the preferred computing device for the first task.

3. The method of claim 1, wherein:
   the one or more scheduling policies includes a predicted execution time policy;
   analyzing the first task in light of the one or more scheduling policies comprises determining predicted execution times for the first task in the one or more compute devices; and
   selecting the first compute device comprises selecting the first compute device based on the predicted execution times.

4. The method of claim 1, wherein:
   the one or more scheduling policies includes a data locality policy;
   analyzing the first task in light of the one or more scheduling policies comprises determining data locality information for data associated with the first task; and selecting the first compute device comprises selecting the first compute device based on the data locality information.

5. The method of claim 1, wherein:
the one or more scheduling policies includes a priority policy; and the method further comprises:
selecting the first task for transmission to the first compute device based on the priority policy.

6. A device, comprising:
a plurality of two or more compute devices configured to execute tasks stored in a plurality of queues; and
a network interface controller configured to:
  receive, from a network external to the device, a first task for processing by one of the plurality of compute devices, wherein the plurality of compute devices are external to the network interface controller,
  analyze, by a scheduler integrated into the network interface controller, the first task in light of one or more scheduling policies stored in memory accessible to the network interface controller,
  select, by the scheduler, a first compute device of from among the plurality of compute devices to receive the first task, based on the analyzing; and
  transmit the first task to a first queue of the plurality of queues, the first queue being associated with the first compute device, the first queue being configured to store tasks for execution by the first compute device, wherein:
the one or more scheduling policies includes a queue occupancy policy; and
the network interface controller is configured to:
  analyze the first task in light of the one or more scheduling policies by determining queue occupancy metrics for one or more of the queues in the plurality of queues, and
  select the first compute device based on the queue occupancy metrics, and
wherein the analyzing, selecting, and transmitting are performed without intervention from a central processing unit of the first compute device.

7. The device of claim 6, wherein:
the compute devices of the plurality of compute devices comprise heterogeneous compute devices.

8. The device of claim 6, wherein:
the plurality of compute devices are configured to access memory via a unified memory architecture.

9. The device of claim 6, wherein:
a second queue of the plurality of queues is configured to store tasks for execution by two or more compute devices of the plurality of compute devices; and
one compute device of the plurality of compute devices is configured to execute tasks stored in a third queue of the plurality of queues and a fourth queue of the plurality of queues.

10. The device of claim 6, wherein:
the one or more scheduling policies includes a preferred computing device policy; and the network interface controller is configured to:
  analyze the first task in light of the one or more scheduling policies by identifying a preferred computing device for the first task based on one of a task identifier associated with the first task and a task type associated with the first task, and
  select the first compute device based on the preferred computing device for the first task.

11. The device of claim 6, wherein:
the one or more scheduling policies includes a predicted execution time policy; and
the network interface controller is configured to:
  analyze the first task in light of the one or more scheduling policies by determining predicted execution times for the first task in the one or more compute devices, and
  select the first compute device based on the predicted execution times.

12. The device of claim 6, wherein:
the one or more scheduling policies includes a data locality policy; and
the network interface controller is configured to:
  analyze the first task in light of the one or more scheduling policies by determining data locality information for data associated with the first task; and
  select the first compute device based on the data locality information.

13. The device of claim 6, wherein:
the one or more scheduling policies includes a priority policy; and
the network interface controller is further configured to:
  select the first task for transmission to the first compute device based on the priority policy.

14. A non-transitory computer-readable medium storing instructions that, when executed by a processor, cause the processor to perform a method for scheduling processing tasks for execution by one or more compute devices in a distributed computing system, the method comprising:
  receiving, via a network interface controller, a first task for processing by one of the two or more compute devices, wherein the two or more compute devices are external to the network interface controller;
  analyzing, by a scheduler integrated within the network interface controller, the first task, in light of one or more scheduling policies stored in memory accessible to the network interface controller;
  selecting, by the scheduler, a first compute device of from among the two or more compute devices to receive the first task, based on the analyzing; and
  transmitting the first task to a first queue associated with the first compute device, the first queue being configured to store tasks for execution by the first compute device, the first queue being included within a plurality of queues,
wherein:
  the one or more scheduling policies includes a queue occupancy policy;
  analyzing the first task in light of the one or more scheduling policies comprises determining queue occupancy metrics for one or more of the queues in the plurality of queues; and
  selecting the first compute device comprises selecting the first compute device based on the queue occupancy metrics, and
wherein the analyzing, selecting, and transmitting are performed without intervention from a central processing unit of the first compute device.

15. The non-transitory computer-readable medium of claim 14, wherein:
the one or more scheduling policies includes one or more of a queue occupancy policy, a preferred computing device policy, a predicted execution time policy, a data locality policy, and a priority policy.

16. The non-transitory computer-readable medium of claim 14, wherein:

the one or more scheduling policies includes a preferred computing device policy;

analyzing the first task in light of the one or more scheduling policies comprises identifying a preferred computing device for the first task based on one of a task identifier associated with the first task and a task type associated with the first task; and selecting the first compute device comprises selecting the first compute device based on the preferred computing device for the first task.

17. The non-transitory computer-readable medium of claim 14, wherein:

the one or more scheduling policies includes a predicted execution time policy;

analyzing the first task in light of the one or more scheduling policies comprises determining predicted execution times for the first task in the one or more compute devices; and selecting the first compute device comprises selecting the first compute device based on the predicted execution times.

18. The non-transitory computer-readable medium of claim 14, wherein:

the one or more scheduling policies includes a data locality policy;

analyzing the first task in light of the one or more scheduling policies comprises determining data locality information for data associated with the first task; and selecting the first compute device comprises selecting the first compute device based on the data locality information.

19. The non-transitory computer-readable medium of claim 14, wherein:

the one or more scheduling policies includes a priority policy; and the method further comprises:

selecting the first task for transmission to the first compute device based on the priority policy.

20. The non-transitory computer-readable medium of claim 14, wherein:

a second queue of the plurality of queues is configured to store tasks for execution by two or more compute devices of a plurality of compute devices; and one compute device of the plurality of compute devices is configured to execute tasks stored in a third queue of the plurality of queues and a fourth queue of the plurality of queues.

* * * * *